(12) United States Patent
Munari

(10) Patent No.: US 7,204,387 B2
(45) Date of Patent: Apr. 17, 2007

(54) COOKING VESSEL GRIP AND RELATIVE MANUFACTURING METHOD

(75) Inventor: Marco Munari, Cardano Al Campo (IT)

(73) Assignee: La Termoplastic F.B.M. S.R.L., Arsago Seprio (IT)

( * ) Notice: Subject to any disclaimer, the term of this patent is extended or adjusted under 35 U.S.C. 154(b) by 264 days.

(21) Appl. No.: 10/756,822

(22) Filed: Jan. 13, 2004

(65) Prior Publication Data

US 2004/0163549 A1 Aug. 26, 2004

(30) Foreign Application Priority Data

Jan. 14, 2003 (EP) ................... 03425012

(51) Int. Cl.
*B65D 25/10* (2006.01)
*B65D 53/00* (2006.01)
*B65D 81/24* (2006.01)

(52) U.S. Cl. .............. 220/755; 220/573.1; 16/425
(58) Field of Classification Search .......... 16/422, 16/425, 430; 220/573.1, 752, 753, 755, 769, 220/912

See application file for complete search history.

(56) References Cited

U.S. PATENT DOCUMENTS

| 2,018,895 | A | * | 10/1935 | Lindsey | ............... | 220/753 |
| 2,931,884 | A | * | 4/1960 | Jepson et al. | ............... | 219/436 |
| 6,170,694 | B1 | * | 1/2001 | Munari | ............... | 220/753 |

* cited by examiner

*Primary Examiner*—Anthony D. Stashick
*Assistant Examiner*—Harry A. Grosso
(74) *Attorney, Agent, or Firm*—Ladas and Parry LLP

(57) ABSTRACT

A cooking vessel grip has an elongated, one-piece body made of plastic material and having, at a first end, a connecting portion for connection to a cooking vessel; and the body has, internally, a longitudinal cavity extending at least along a portion gripped in use.

15 Claims, 2 Drawing Sheets

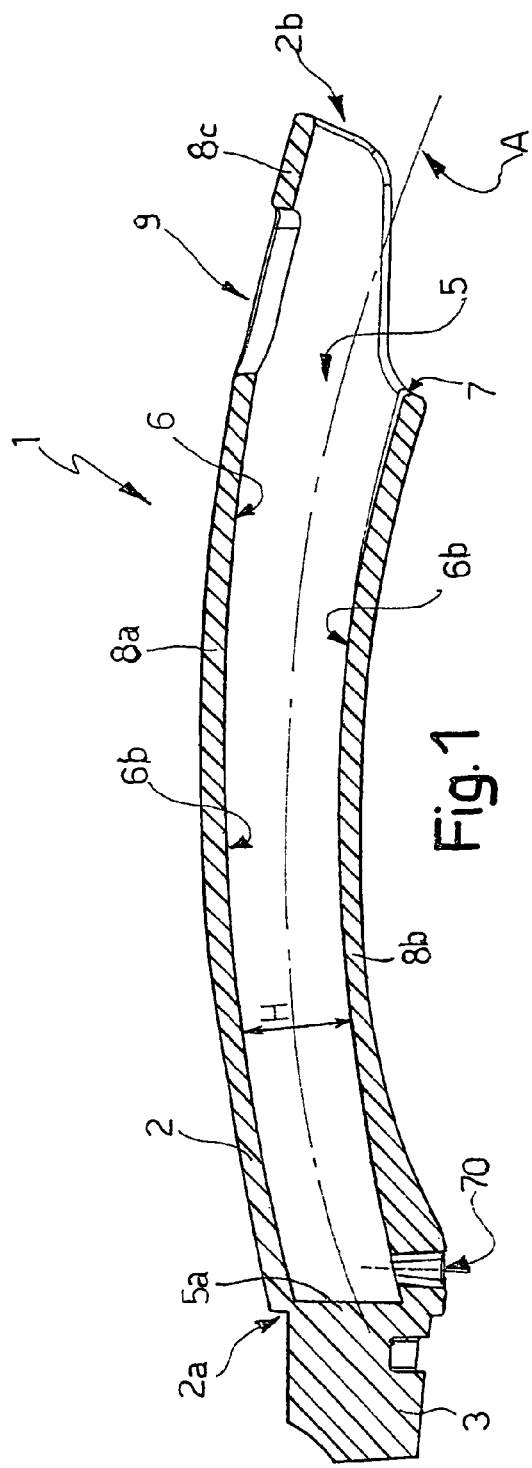
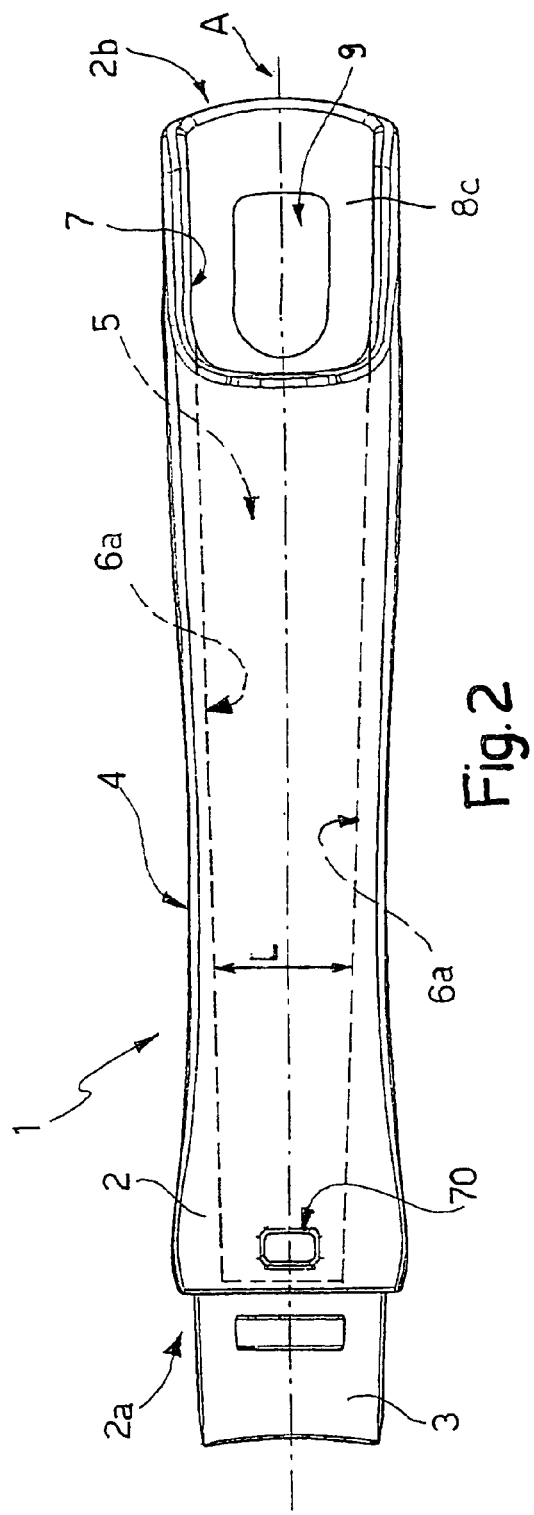

COOKING VESSEL GRIP AND RELATIVE MANUFACTURING METHOD

The present invention relates to a cooking vessel grip, in particular a frying-pan handle, and to a relative manufacturing method.

BACKGROUND OF THE INVENTION

As is known, food cooking vessels, such as frying-pans or saucepans, normally have grips that can be handled directly by the user even when cooking, or at any rate when the vessels are still hot. And to improve thermal insulation, most grips are made of (polymer) plastic materials, typically thermosetting resins, such as Bakelite, rather than metal.

In the case of frying-pans (that is, a normally round, low-sided, flaring cooking vessel with one grip), the most common type of grip comprises a normally elongated body with an attachment at one end for connection to the frying-pan. The body is normally molded in one piece from thermosetting polymer material, and is substantially solid except, possibly, for small seats for housing decorative inserts or fastening means, such as screws or rivets, for connection to the vessel.

A drawback of grips made of plastic material, however, lies precisely in their being solid. That is, if cooking is prolonged, or if the vessel is placed on the range with the grip close to a bare flame, even grips made of thermally insulated materials may reach high enough temperatures to burn the user. When this happens, it is important that the grip should cool quickly once the cause of the grip overheating is removed. On account of its thickness and low thermal conductivity, however, a solid grip made of plastic material is very slow to cool, thus prolonging the risk of burns to the user.

SUMMARY OF THE INVENTION

It is an object of the present invention to provide a cooking vessel grip designed to eliminate the aforementioned drawbacks, and to a relative manufacturing method.

According to the present invention, there is provided a cooking vessel grip comprising an elongated, one-piece body made of plastic material and having, at a first end, means for connection to a cooking vessel; the grip being characterized in that said body comprises, internally, a longitudinal cavity extending at least along a portion gripped in use.

In other words, on account of the longitudinal cavity, the thickness of the one-piece body along the portion gripped by the user is reduced, so that, in the event of the grip overheating, only a small amount of heat can be stored, and cooling is must faster, particularly along the user-gripped portion, thus substantially eliminating the risk of accidental burns. Moreover, the amount of plastic material employed and, therefore, the weight of the grip are advantageously reduced, without impairing the rigidity and mechanical strength of the grip.

In accordance with a further aspect of the invention, said longitudinal cavity extends substantially along the whole length of said body.

Said longitudinal cavity is also open at a second end of said body opposite said first end.

Air circulation and change inside the longitudinal cavity is thus improved to assist dispersion by convection of the heat accumulated inside the grip. Moreover, the exposed, useful heat-exchange surface of the one-piece body is considerably increased. That is, if the grip is not placed close to a strong source of heat, so that the surrounding air is substantially at room temperature, the heat transmitted by conduction by the vessel when cooking is not sufficient to heat the grip to the extent of being dangerous to the user. And at any rate, cooling of the grip is much faster.

In accordance with a further aspect of the invention, said longitudinal cavity is curved.

Air circulation inside the longitudinal cavity is thus further improved.

Moreover, said body has a longitudinally curved profile.

Such a profile is ergonomic, provides for easy grip by the user, makes the grip easy to handle, and is also highly attractive.

According to the present invention, there is also provided a method of manufacturing a cooking vessel grip of the type having an elongated, one-piece body, the method comprising a step of molding a plastic material in a mold having, internally, a molding seat of the same shape as the grip; and the method being characterized by providing, inside said mold, a movable member defining a longitudinal cavity inside said body; and in that, following said molding step, said movable member is extracted from one end of said body to free said longitudinal cavity.

BRIEF DESCRIPTION OF THE DRAWINGS

A non-limiting embodiment of the invention will be described by way of example with reference to the accompanying drawings, in which:

FIG. 1 shows a longitudinally sectioned side view of a cooking vessel grip in accordance with the present invention;

FIG. 2 shows a bottom plan view of the FIG. 1 grip;

DETAILED DESCRIPTION OF THE INVENTION

Figure 3:
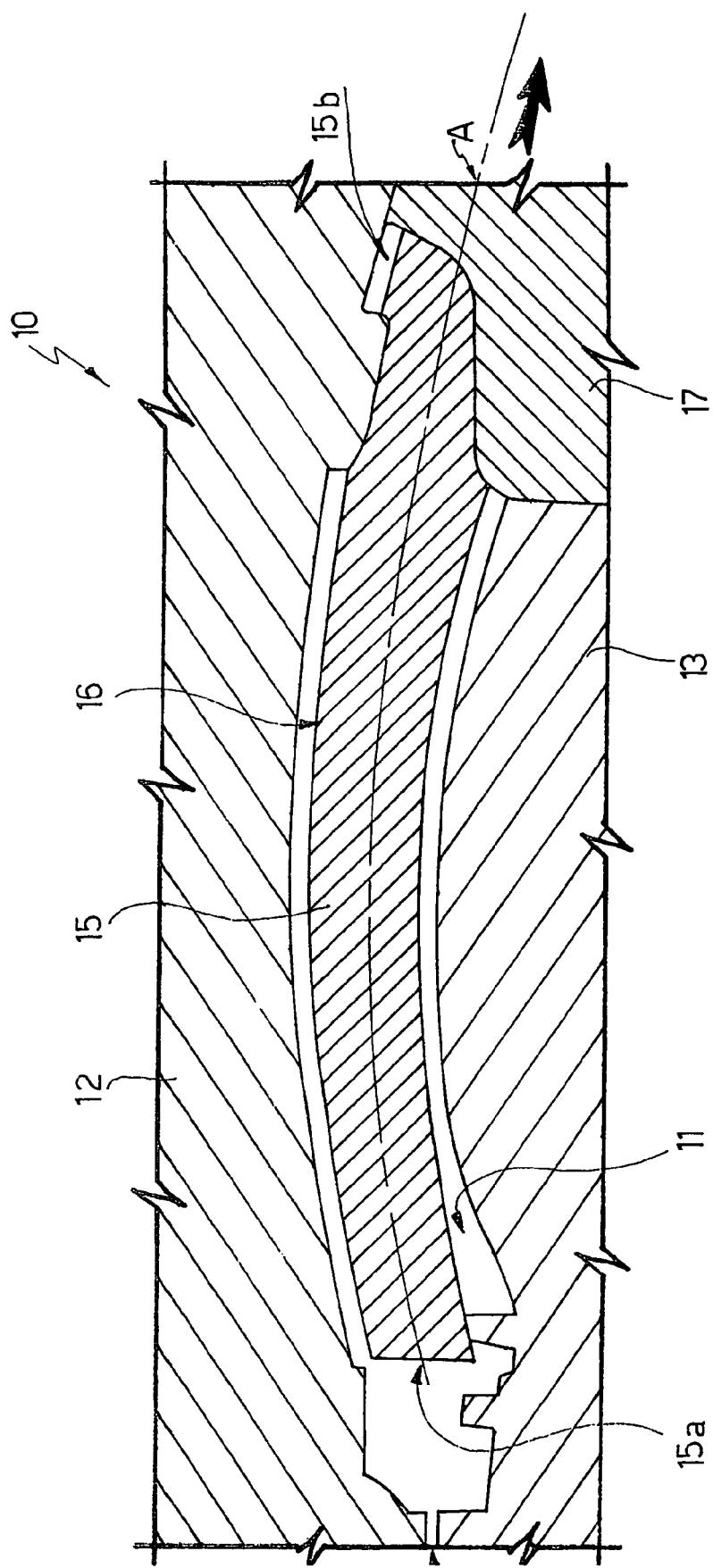
FIG. 3 shows a simplified, schematic cross section of a mold for producing the FIG. 1 grip.

With reference to FIGS. 1 and 2, a cooking vessel grip, in particular a frying-pan handle, is indicated as a whole by 1, and comprises an elongated, one-piece body 2 molded from plastic material. Body 2 is preferably made of thermosetting polymer material, in particular a phenol-formaldehyde molding resin, such as Bakelite.

Body 2 is a hollow tubular body closed at one end, elongated longitudinally along an axis A, and having a longitudinally curved profile. More specifically, axis A is a curved central axis of symmetry of body 2.

A first end 2a of body 2 has means 3 of any known type for connection to a cooking vessel, such as a known frying-pan or saucepan not shown for the sake of simplicity. More specifically, a connecting portion 3, for connection in known manner to a cooking vessel, projects from first end 2a of body 2; and connection to the cooking vessel may be either fixed or reversible.

Body 2 also comprises a grip portion 4 gripped in use by the user and located adjacent to and longitudinally consecutive to connecting portion 3 along axis A. In the non-limiting embodiment shown, grip portion 4 has a lateral contraction substantially at its central portion. More specifically, the longitudinal curvature and the lateral contraction of body 2 are such as to provide for easy grip of handle 1 by the user.

Inside, body 2 has a longitudinal cavity 5 extending at least along a portion gripped in use by the user, i.e. along grip portion 4. More specifically, longitudinal cavity 5 is formed entirely inside grip portion 4, in which it defines an air-circulating chamber. In the preferred embodiment shown, longitudinal cavity 5 extends substantially along the whole length of body 2, or more specifically of grip portion 4, between first end 2a and an opposite second end 2b.

Longitudinal cavity 5 is located centrally about curved axis A inside body 2, and extends substantially along the longitudinal profile of body 2. Longitudinal cavity 5 also curves longitudinally, and extends along axis A, which lies in a central vertical plane of body 2 and is, for example, in the form of an arc of a circle.

Longitudinal cavity 5 is a dead cavity, is closed at first end 2a of body 2 by an end wall 5a connecting grip portion 4 to connecting portion 3, and is open at second end 2b of body 2, so as to enable air circulation and change inside longitudinal cavity 5 to cool body 2 quickly.

Longitudinal cavity 5 is defined laterally by a substantially continuous inner lateral surface 6, with no sharp edges, of body 2, tapers towards first end 2a of body 2, and decreases in cross section from second end 2b to first end 2a.

In the non-limiting embodiment shown, longitudinal cavity 5 has a substantially quadrangular cross section with rounded edges, and is defined by two pairs of opposite inner lateral surfaces 6a, 6b converging towards first end 2a. Longitudinal cavity 5 thus tapers towards first end 2a in two directions perpendicular to each other and to axis A, and respectively defining a width l and a height H of longitudinal cavity 5. At each point along longitudinal cavity 5, width L and height H represent the distances, measured perpendicular to axis A at that point, between opposite inner lateral surfaces 6a or 6b.

The second end 2b of body 2 has an opening 7 defining an inlet section of longitudinal cavity 5, and itself defined by a continuous peripheral edge. Opening 7, i.e. the inlet section of longitudinal cavity 5, is substantially oblique with respect to axis A, so as to increase the incoming/outgoing air flow surface and so improve air change.

The inlet section of longitudinal cavity 5 being oblique with respect to axis A, body 2 has, at second end 2b, a wall 8a—in the example shown, the top wall—which projects longitudinally beyond an opposite wall 8b—in the example shown, the bottom wall—so that (top) wall 8a comprises an end portion 8c projecting longitudinally beyond (bottom) wall 8b, and which therefore is not superimposed over wall 8b in a direction perpendicular to axis A.

A slot 9 is formed through end portion 8c, close to second end 2b of body 2, and is superimposed over opening 7 in a direction perpendicular to axis A, so that the projection of slot 9 in a direction perpendicular to axis A lies entirely within opening 7. Slot 9 provides, on the one hand, for hooking grip 1 to a support (not shown), and, on the other, for assisting air circulation and change inside longitudinal cavity 5.

At first end 2a where longitudinal cavity 5 is closed, a through hole 70 is formed in wall 8b of body 2 to permit outflow of air and any condensation or washing-up water from longitudinal cavity 5.

With reference to FIG. 3, grip 1 is produced using a mold 10 having a molding seat 11 inside of the same shape as grip 1 for molding: FIG. 1 therefore also shows molding seat 11 in negative. Mold 10 comprises two half-molds 12, 13, which mate to define molding seat 11, and which are parted to open mold 10 and remove the single molded piece. A feed conduit 14 for injecting the molding material is formed between (or in one of) half-molds 12, 13, and preferably comes out inside the portion of molding seat 11 where connecting portion 3 of grip 1 is formed.

Mold 10 is provided inside with a movable member defined by a removable insert 15 defining, and therefore the same shape as, longitudinal cavity 5 of grip 1. More specifically, insert 15 is elongated longitudinally, has a longitudinally curved profile, and extends along curved axis A defined previously.

Insert 15 is defined by a substantially continuous work surface 16 with no sharp edges and the same shape as inner lateral surface 6 of body 2 (FIGS. 1 and 2) to be formed in mold 10, and has a free end 15a, and an extraction end 15b longitudinally opposite free end 15a and connected to a carriage 17 movable with respect to mold 10. Insert 15 tapers and decreases in cross section from extraction end 15b towards free end 15a (and so tapers towards end 15a in two directions perpendicular to each other and to axis A).

Grip 1 is formed at a molding step conducted inside mold 10: an appropriate plastic material—preferably a thermosetting polymer material, in particular a phenol-formaldehyde molding resin (Bakelite)—is fed, in the fluid state and with mold 10 closed, along feed conduit 14 into molding seat 11.

After a cooling step, in which the plastic material sets and polymerizes, insert 15 is extracted from second end 2b of body 2, while mold 10 still closed. More specifically, carriage 17 is run along a curved trajectory away from mold 10, and is preferably moved along axis A and parallel to the central vertical plane of body 2, so that insert 15, which is curved and tapers towards free end 15a, is drawn out without interfering with inner lateral surface 6 of body 2, and so frees longitudinal cavity 5.

Half-molds 12, 13 are then parted to open mold 10, and grip 1 is extracted from mold 10 by means of known extractors not shown.

Clearly, changes may be made to the grip and manufacturing method as described herein without, however, departing from the scope of the present invention.

In particular, longitudinal cavity 5 may be shaped differently from the one described. For example, two opposite inner lateral surfaces 6a or 6b of body 2 defining longitudinal cavity 5 may be parallel as opposed to converging.

Axis A may curve otherwise than in the form of an arc of a circle.

The sections of longitudinal cavity 5 perpendicular to axis A may also be shaped differently from those described, e.g. be substantially circular or oval; in which case, the radius and, respectively, at least one axis of the sections decrease towards first end 2a of body 2. Whichever the case, longitudinal cavity 5 always tapers from first end 2a towards second end 2b.

As regards the method of manufacturing grip 1, insert 15 may be extracted from longitudinal cavity 5 even after mold 10 is opened, i.e. after parting half-molds 12, 13.

Insert 15 may be shaped differently from the one shown, while still tapering from extraction end 15b towards free end 15a.

The invention claimed is:

1. A cooking vessel grip comprising an elongated, one-piece body (2) made of plastic material and having, at a first end (2a), means (3) for connection to a cooking vessel; said body (2) having, internally, a longitudinal cavity (5) extending at least along a portion gripped in use, wherein said body (2) is a one-piece body which is molded from said plastic material; said body (2) is a hollow tubular body having an inner longitudinal cavity (5) extending along an axis, said cavity being surrounded by a continuous lateral surface (6) closed around the axis; said longitudinal cavity (5) extends between two opposite longitudinal ends (2a, 2b): a first end (2a) is closed by an end wall (5a), while the second end (2b)

is open; said longitudinal cavity (5) in the body is curved, and said longitudinal cavity (5) in the body tapers towards said first body end (2a).

2. A grip as claimed in claim 1, wherein said longitudinal cavity (5) extends substantially along the whole length of said body (2).

3. A grip as claimed in claim 1, wherein said longitudinal cavity (5) extends along an axis (A); an inlet section of said longitudinal cavity (5) is located at said second end (2b), and is oblique with respect to said axis (A).

4. A grip as claimed in claim 1, wherein said body (2) has a longitudinally curved profile.

5. A grip as claimed in claim 1, wherein said body (2) has a through hole (70) formed at said first end (2a) and communicating with said longitudinal cavity (5).

6. A grip as claimed in claim 1, wherein said plastic material is a thermosetting polymer material, including a phenol-formaldehyde molding resin.

7. A grip as claimed in claim 1, wherein said body (2) extends along a curved axis (A), and comprises a connecting portion (3) for connection to a cooking vessel, and a grip portion (4) adjacent to the connecting portion along said axis (A) and which is gripped in use; said longitudinal cavity (5) being formed entirely inside said grip portion (4).

8. A grip as claimed in claim 1, wherein said grip body has an opening at a lower surface of the body adjacent to said second end and which communicates with the open second end via said longitudinal cavity.

9. A grip as claimed in claim 8, wherein said grip body is provided with a slot in an upper surface of the grip body, said slot extending above the opening in the lower surface.

10. A grip as claimed in claim 1, wherein said grip body has opposite side walls which are inwardly curved towards one another to define a grip portion with lateral constriction.

11. A method of manufacturing a cooking vessel grip (1) as in claim 1, the method comprising a step of molding a plastic material in a mold (10) having, internally, a molding seat (11) of the same shape as the grip (1); and the method being characterized by providing, inside said mold (10), a movable member (15) defining a longitudinal cavity (5) inside said body (2); and in that, following said molding step, said movable member (15) is extracted from one end of said body (2) to free said longitudinal cavity (5).

12. A method as claimed in claim 11, characterized in that said movable member (15) is a curved, elongated insert.

13. A method as claimed in claim 11, characterized in that said movable member (15) tapers towards a free end (15a).

14. A method as claimed in claim 11, characterized in that said movable member (15) is extracted along a curved trajectory (A).

15. A method as claimed in claim 14, characterized in that said curved trajectory (A) lies in a central plane of the grip (1).

* * * * *